United States Patent
Musy et al.

(10) Patent No.: US 7,344,302 B2
(45) Date of Patent: Mar. 18, 2008

(54) CONTROL MEMBER WITH A BALANCE WHEEL AND A PLANAR SPIRAL FOR A WATCH OR CLOCK MOVEMENT

(75) Inventors: Jean-Pierre Musy, Begnins (CH); Frédéric Maier, Neuchatel (CH); Michel Belot, Colombier (CH)

(73) Assignee: Patek, Philippe SA, Geneva (CH)

(*) Notice: Subject to any disclaimer, the term of this patent is extended or adjusted under 35 U.S.C. 154(b) by 126 days.

(21) Appl. No.: 10/554,296

(22) PCT Filed: Apr. 21, 2004

(86) PCT No.: PCT/IB2004/001389

§ 371 (c)(1),
(2), (4) Date: Oct. 26, 2005

(87) PCT Pub. No.: WO2004/097534

PCT Pub. Date: Nov. 11, 2004

(65) Prior Publication Data
US 2006/0262652 A1    Nov. 23, 2006

(30) Foreign Application Priority Data
Apr. 29, 2003    (EP) .................................. 03009603

(51) Int. Cl.
*G04B 17/04* (2006.01)
(52) U.S. Cl. ...................................... 368/175
(58) Field of Classification Search ............... 368/175, 368/176–178
See application file for complete search history.

(56) References Cited

U.S. PATENT DOCUMENTS

| 3,154,912 A | 11/1964 | Pinkas |
| 3,528,237 A | 9/1970 | Suard |
| 3,826,076 A | * 7/1974 | Tuetey ...................... 368/129 |

FOREIGN PATENT DOCUMENTS

| CH | 327 796 A | 2/1958 |
| GB | 697 864 A | 9/1953 |

OTHER PUBLICATIONS

E. Michel & G. Michel: "Spiraux plats concentriques sans courbes", Bulletin Annuel de la Société Suisse de Chronométrie, vol. IV, 1957-1963—pp. 162-169, XP002272279.

* cited by examiner

*Primary Examiner*—P. Austin Bradley
*Assistant Examiner*—Sean Kayes
(74) *Attorney, Agent, or Firm*—Bacon & Thomas, PLLC

(57) ABSTRACT

A regulating device including a balance (1) and a plane hairspring (2) for a time piece movement, the plane hairspring (2) including a stiffened portion (8) in its outer turn (7) that is arranged to cause the deformations of the turns to be substantially concentric. The spacing (d) between a terminal portion of the outer turn (7) and the last-but-one turn (9) of the hairspring (2) is large enough for said last-but-one turn (9) to remain free radially during expansions of the hairspring (2) up to amplitudes corresponding substantially to the maximum angle of rotation of the balance (1) in the movement.

22 Claims, 14 Drawing Sheets

PRIOR ART

PRIOR ART

PRIOR ART

CONTROL MEMBER WITH A BALANCE WHEEL AND A PLANAR SPIRAL FOR A WATCH OR CLOCK MOVEMENT

BACKGROUND

A. Field

The present invention relates to a regulating device having a balance and a plane hairspring for a time piece movement.

B. Related Art

It is known that the turns of a plane hairspring deform eccentrically when the hairspring is in operation. This eccentric deformation of the turns, which is explained by the fact that the center of gravity of the hairspring does not correspond to the center of rotation of the balance and hairspring assembly, disturbs the setting of the balance and hairspring assembly and makes it anisochronous.

The center of gravity of the hairspring could be returned arbitrarily to the center of rotation of the balance by being shifted, however that would not solve the problem since during the working of the hairspring the center of gravity would move and would therefore no longer coincide with the initial center of gravity.

Two different solutions have been proposed for causing the center of gravity and the center of rotation to coincide while a plane hairspring is working, thereby making the deformations of the turns concentric:

the Breguet hairspring with a so-called Philips curve in which an outer curve is moved into a second plane above the hairspring plane; and the hairspring with angle strip as described in 1958 by Messrs. Emile and Gaston Michel in an article entitled "Spiraux plats concentriques sans courbes" [Concentric flat hairsprings without curves], published by Société Suisse de Chronométrie.

The first solution amounts to modifying the initial plane hairspring so that it becomes a hairspring occupying a plurality of planes. That solution does not come within the ambit of the present invention which relates only to plane hairsprings.

The second solution consists in stiffening a determined portion of a turn by giving it the shape of an angle strip. The angle strip is situated either in the outer turn or in a central turn. Nevertheless, according to the authors of that solution, although angle strip in the central turn does indeed provide a significant improvement in terms of the isochronism of the balance and hairspring assembly, angle strip in the outer turn does not give satisfaction. Said authors even abandoned the hairspring with angle strip in the outer turn, in the belief that they had been wasting their time on this topic.

BRIEF SUMMARY OF THE INVENTION

The present invention seeks to improve the isochronism of a balance and hairspring assembly by stiffening a portion of the outer turn of the hairspring, and for this purpose the invention provides a regulating device as defined in the appended claims as well as a timepiece, such as a watch, incorporating the above-mentioned regulating device.

The present invention is based on the observation that, contrary to the conclusions reached by the authors of the above-mentioned article "Spiraux plats concentriques sans courbes", it is possible to improve significantly the isochronism of a balance and hairspring assembly by stiffening a determined portion of the outer turn of the hairspring, provided that the spacing between the terminal portion of the outer turn and the last-but-one turn of the hairspring is sufficiently large to ensure that said last-but-one turn remains radially free during expansions of the hairspring up to amplitudes corresponding substantially to the maximum angle of rotation of the balance in the movement.

According to the present inventors, the reason why the solution using angle strip in the outer turn as described in the above-mentioned article provided no improvement in terms of isochronism, stems from the fact that during large-amplitude expansions of the hairspring the last-but-one turn came into abutment against the outer turn or against a stud or an index pin associated with said outer turn, thereby significantly disturbing the operation of the hairspring. The present inventors have observed that by modifying the hairspring described in the above-mentioned article in such a manner that expansion of the last-but-one turn is not impeded by the last turn (the outer turn), nor by its accessories such as the stud and the index pins, operation of the balance and hairspring assembly becomes substantially isochronous.

The present invention also provides a method of designing a regulating device comprising a balance and a plane hairspring, the method being as defined in accompanying claim 13, with particular implementations thereof being defined in the corresponding dependent claims.

DESCRIPTION OF THE DRAWINGS

Other characteristics and advantages of the present invention will appear on reading the following detailed description made with reference to the accompanying drawings, in which.

DETAILED DESCRIPTION OF THE PREFERRED

Figure 1:
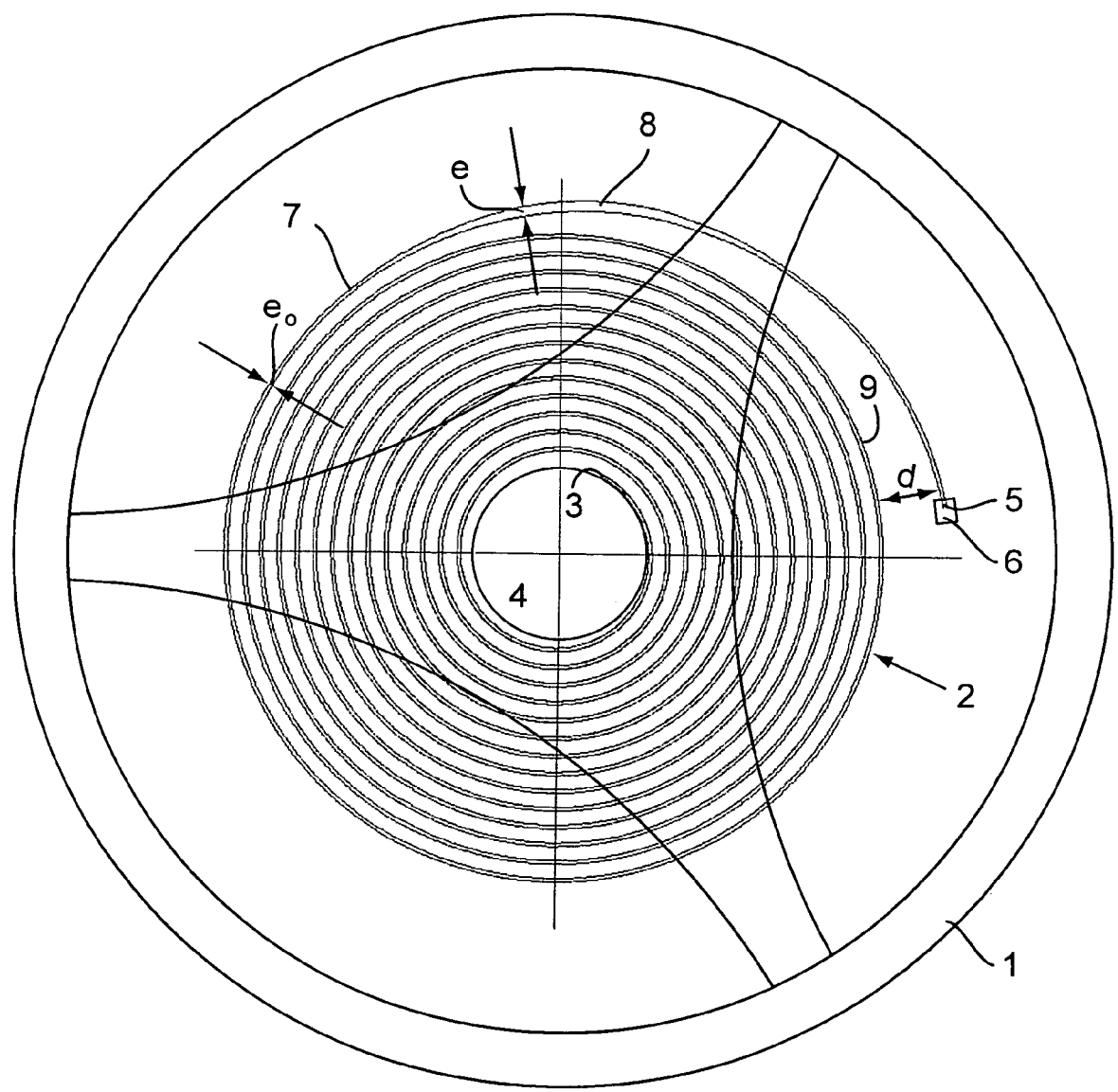
FIG. 1 is a plan view of a regulating device according to a first embodiment of the invention.

With reference to FIG. 1, a regulating device for a time piece movement according to the invention comprises a balance 1 and a flat hairspring 2 in the form of an Archimedes' spiral. The inner end 3 of the hairspring 2 is fixed to a collet 4 driven onto the shaft of the balance 1 and is therefore continuously subjected to the rotary torque from the balance 1. In known manner, the rotary shaft of the balance and hairspring assembly turns in bearings (not shown). The outer end 5 of the hairspring 2 is fixed to a stationary part of the movement, typically the balance-cock, via a fixing member 6 called "stud".

According to the invention, the hairspring 2 has in its outer turn 7 a stiffened portion 8 that is arranged to cause the deformations of the turns to be substantially concentric during expansions and compressions of the hairspring 2. This stiffened portion 8 is constituted by a portion of the strip forming the hairspring having a greater thickness e in the plane of the hairspring than does the remainder of the strip. This thickness e is large enough relative to the thickness $e_0$ of the remainder of the strip to confer stiffness to the stiffened portion 8 that is much greater than that of the remainder of the strip. Thus, during expansions and compressions of the hairspring, the stiffened portion 8 hardly deforms at all, and therefore does not participate in the deformation of the turns. In the example shown, the thickness e of the stiffened portion 8 varies, with its minimum, at the ends of the stiffened portion, being equal to the thickness $e_0$ of the remainder of the strip and its maximum, in the center of the stiffened portion, being equal to three times the thickness $e_0$ of the remainder of the strip. Nevertheless, as will be apparent in the following, the thickness e of the stiffened portion could equally well be constant or could vary only in the terminal portions of the stiffened portion. The extra thickness presented by the stiffened portion 8 relative to the remainder of the strip is preferably situated exclusively on the outer side of the last turn 7 so as to ensure that it cannot come into contact with the last-but-one turn, identified by reference 9. The way in which the stiffened portion 8 is arranged along the hairspring 2 is explained below with reference to the method of the invention.

Figure 2:
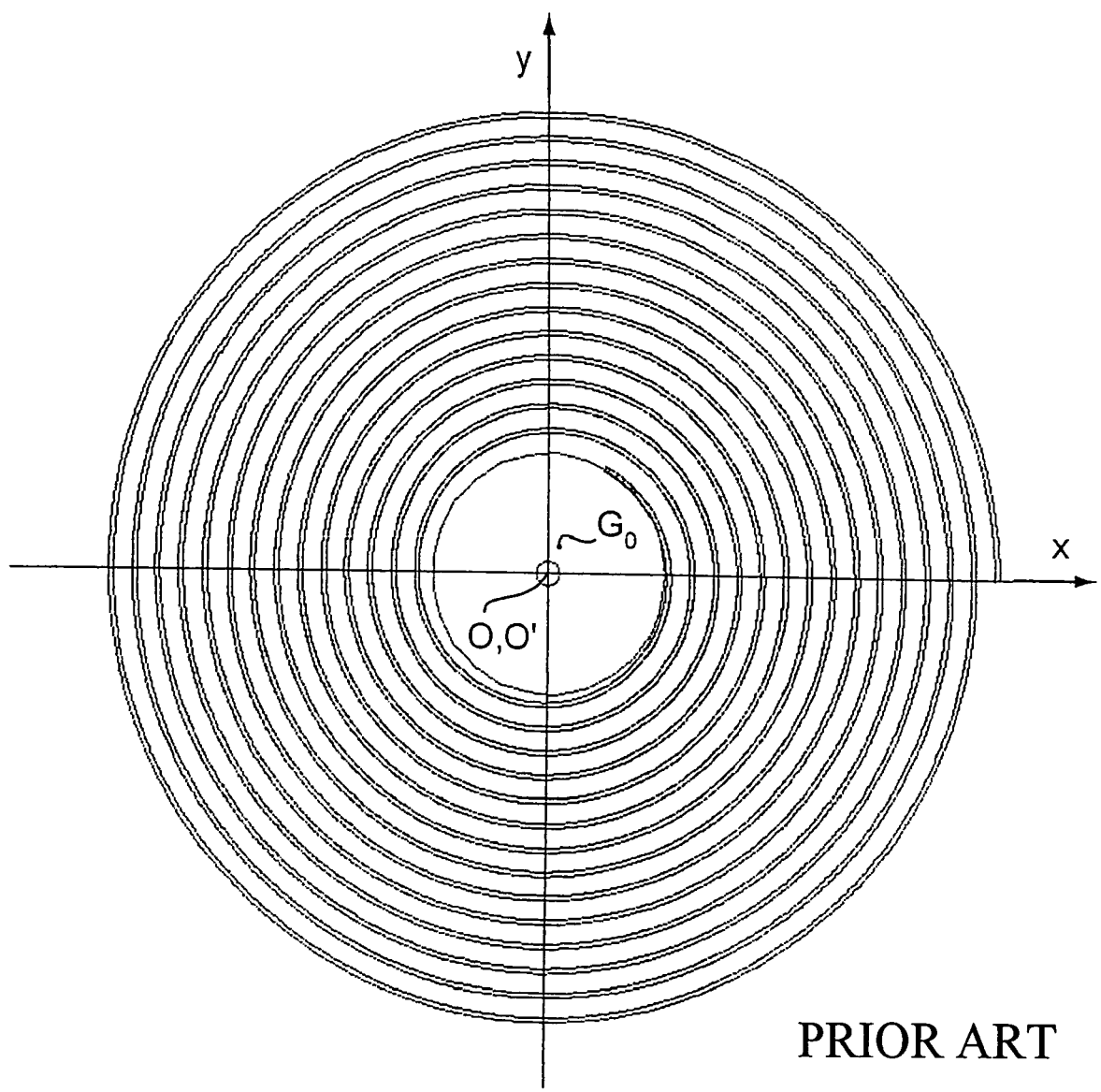
FIG. 2 is a plan view showing, by way of comparison, the hairspring of a conventional regulating device, in its rest position.
Figure 3:
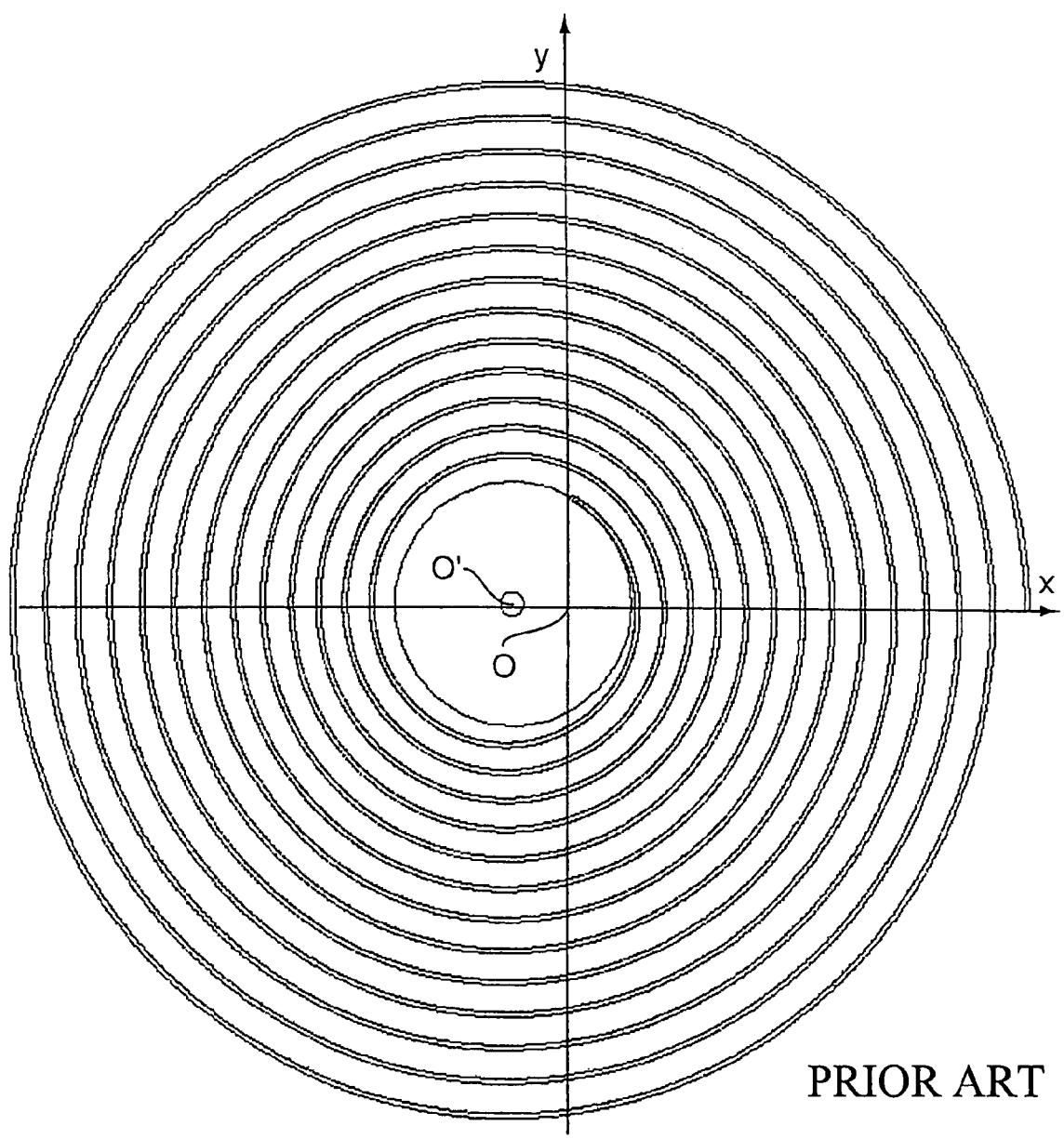
FIGS. 3 and 4 are plan views showing the hairspring of FIG. 2 respectively in expansion and in compression, in a theoretical situation where the center of the hairspring is free, the outer end of the hairspring being taken as a fixed reference point.
Figure 4:
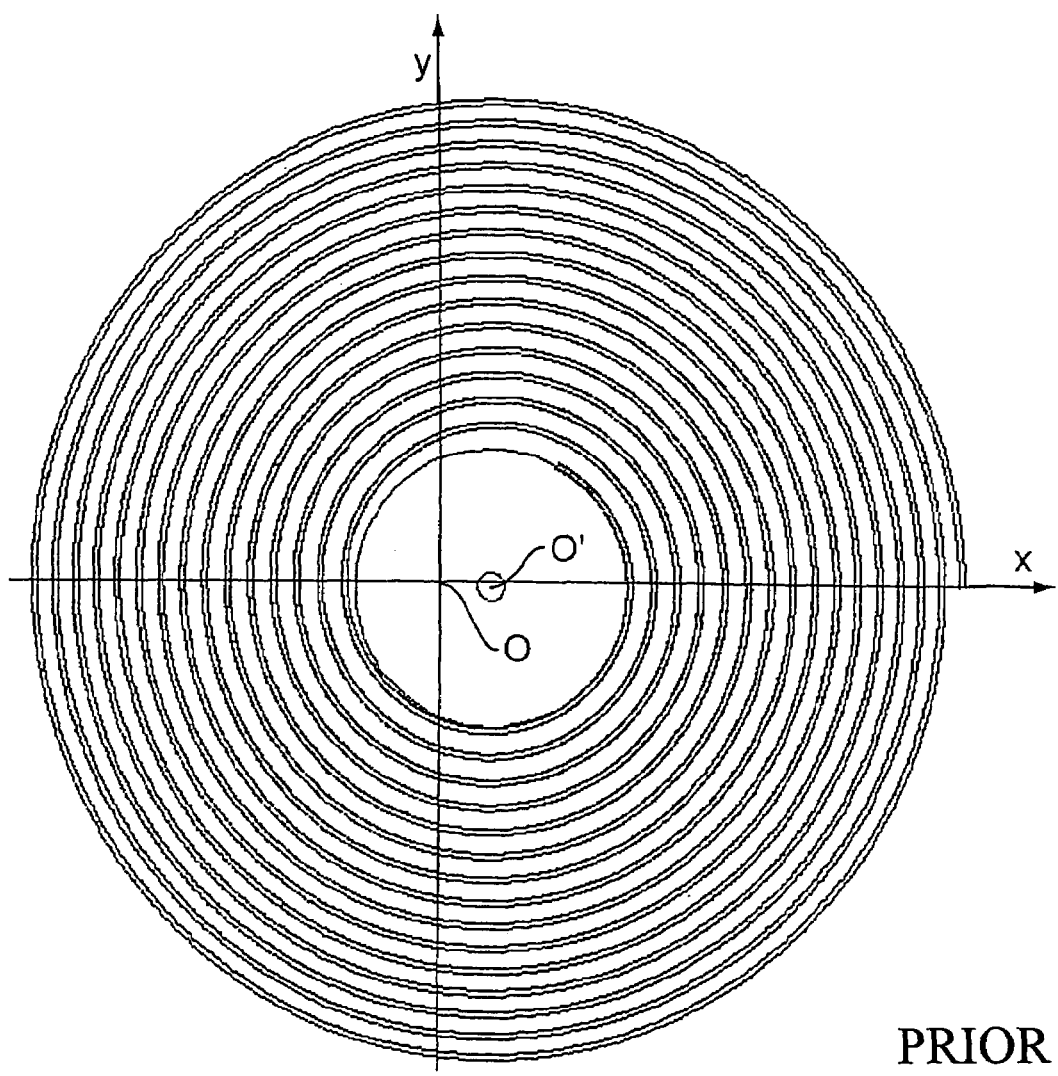

As explained in the introduction to this application, the turns in a conventional hairspring deform eccentrically since the center of gravity of the hairspring does not correspond with its geometrical center. The geometrical center of the hairspring is the center of the frame of reference in which its spiral is defined. It is situated on the axis of rotation of the balance and hairspring assembly. FIG. 2 shows, by way of illustration, a conventional hairspring in the form of an Archimedes' spiral in its rest position, together with the associated frame of reference (O, x, y) and the center of gravity $G_0$ of the hairspring. FIGS. 3 and 4 show the same hairspring respectively after it has been expanded by one revolution (360°) and after it has been compressed by one revolution by applying a pure torque to the inner end of the hairspring, the outer end of the hairspring being taken as a fixed reference point. The term "pure torque" is used to mean that the inner end of the hairspring is free, i.e. the theoretical circumstance is assumed whereby the axis of the balance and hairspring assembly is free to move parallel to the plane of the hairspring, or in other words is not held by bearings. As can be seen, during such expansion and compression, the geometrical center O' of the hairspring as represented by a point inside a circle moves mainly along the axis (O, x), towards negative values for x during expansion and towards positive values for x during compression, and therefore no longer coincides with the center O of the frame of reference. In practice, since the geometrical center of the hairspring cannot move because of the constraint imparted by the bearings on the shaft of the balance and hairspring assembly, the way in which the turns deform during expansion or compression of the hairspring is necessarily eccentric, and not concentric as shown in FIGS. 3 and 4.

Figure 5:
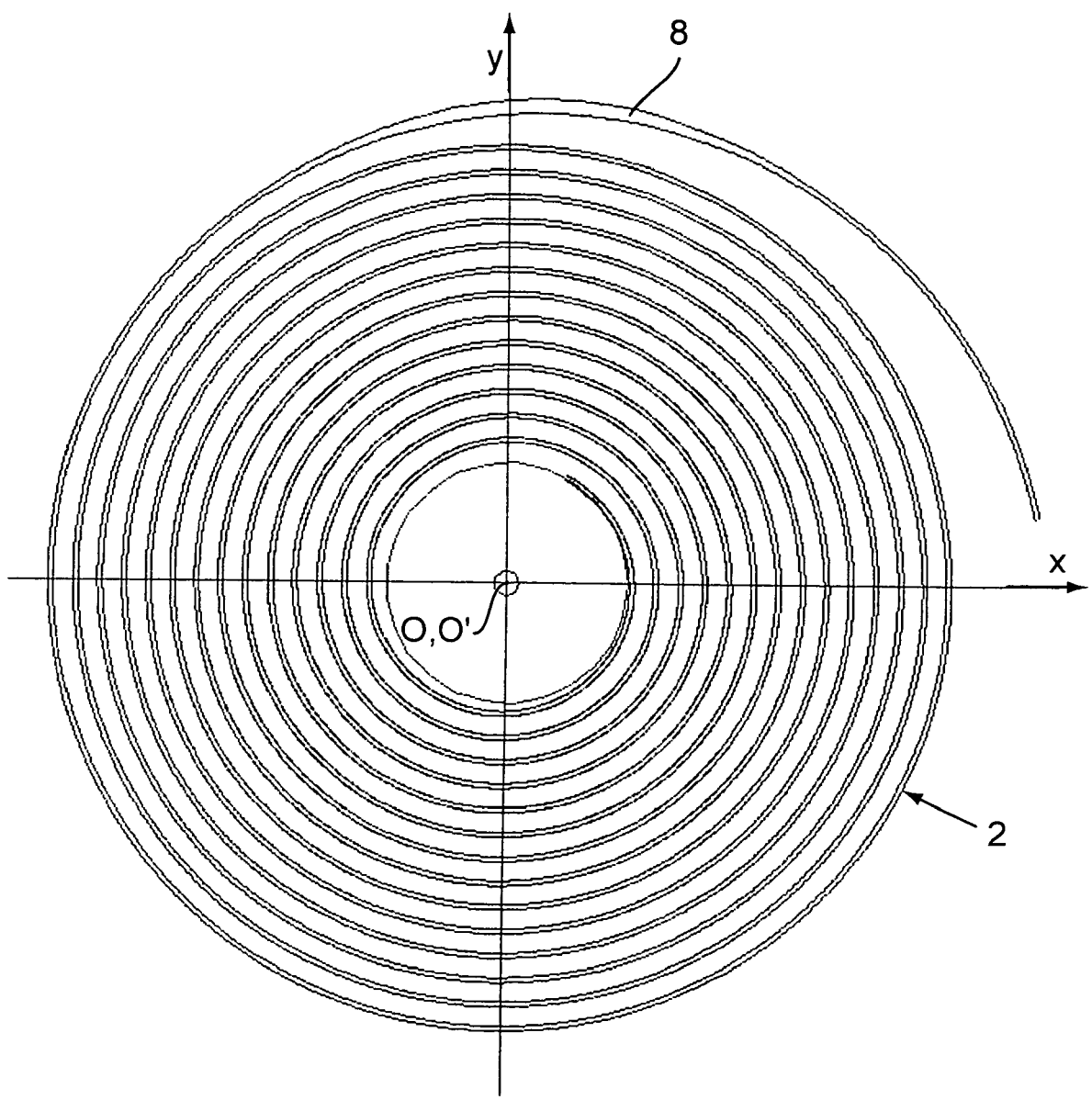
FIG. 5 is a plan view showing the hairspring of the regulating device of the first embodiment of the invention in its rest position.
Figure 6:
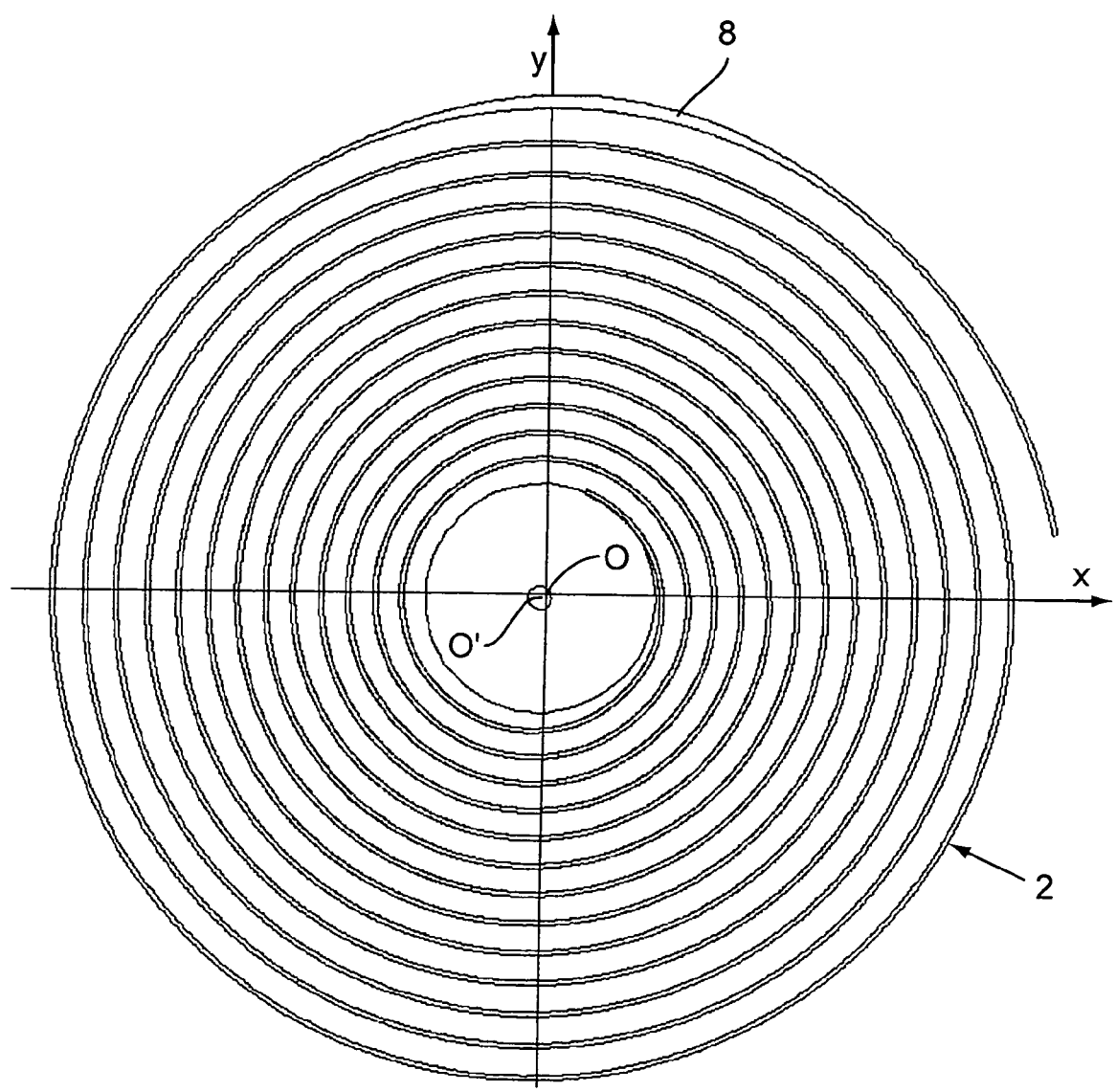
FIGS. 6 and 7 are plan views showing the hairspring of FIG. 5 respectively in expansion and in compression, in a theoretical situation where the center of the hairspring is free, the outer end of the hairspring being taken as a fixed reference point.
Figure 7:
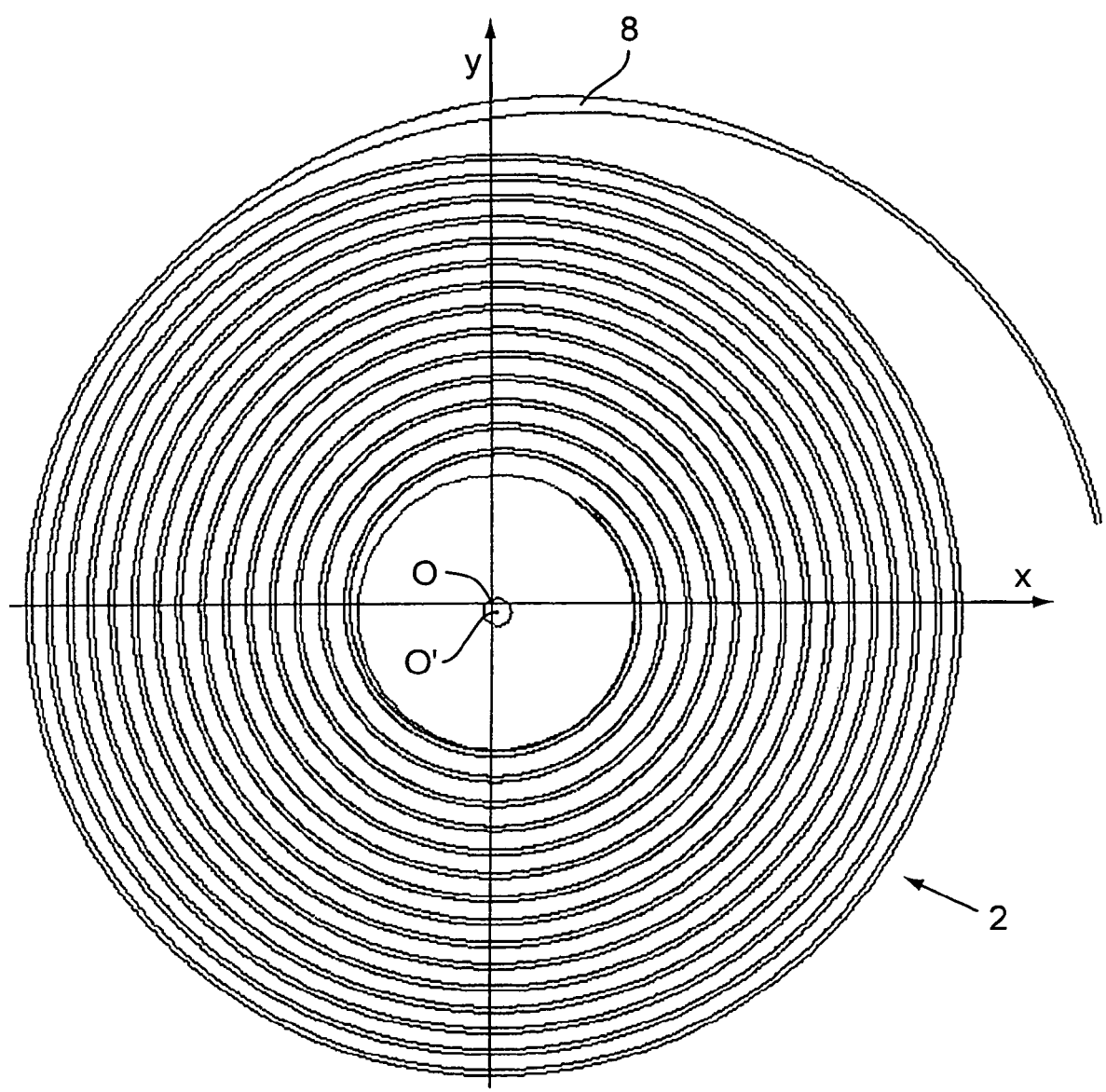

In the present invention, the function of the stiffened portion 8 is to bring the center of deformation of the hairspring 2 to the geometrical center of the said hairspring. The center of deformation of the hairspring is the center of gravity of the elastic portion of the hairspring, i.e. of the portion of the hairspring other than its stiffened portion 8. FIGS. 5, 6, and 7 show the hairspring 2 of the regulating device of the invention respectively at rest, expanded after applying a pure torque of the same amplitude as in FIG. 3 (the outer end of the hairspring being taken as a fixed reference point, as in FIG. 3), and in compression after applying a pure torque having the same amplitude as in FIG. 4 (the outer end of the hairspring being taken as a fixed reference point, as in FIG. 4). It can be seen that the geometrical center O' of the hairspring 2 hardly moves and remains in coincidence with the center O of the frame of reference during such expansion and compression. This implies that in practice the constraint exerted by the bearings on the shaft of the balance and hairspring assembly is sufficiently small for the deformations of the turns to remain substantially concentric, as in the theoretical circumstances of FIGS. 6 and 7. This leads to a significant improvement in the isochronism of the balance and hairspring assembly, which will work purely in torque in its bearings without being subjected to disturbing forces due to reaction from the bearing supports.

With reference again to FIG. 1, according to another characteristic of the invention, the spacing or radial distance d between a terminal portion of the outer turn 7 and the last-but-one turn 9 is large enough to ensure that this last-but-one turn 9 remains radially free during expansions of the hairspring 2 up to amplitudes corresponding substantially to the maximum angle of rotation of the balance 1 in the movement. The term "maximum angle of rotation" is used herein to mean the maximum angle that the balance wheel 1 is liable to reach during normal conditions of operation of the movement. This angle is determined in particular by the force from the mainspring (barrel spring) of the movement. It is less than the knocking angle. In a typical embodiment of the invention, the maximum angle of rotation is slightly less than the knocking angle and is equal to about 330°. It is recalled that the knocking angle is defined as being the angle of rotation of the balance from which knocking occurs, i.e., typically, the angle from which the impulse-pin of the balance comes into contact with the outer face of a horn of the fork of the escapement pallets.

In other words, the radial spacing or distance d is large enough to ensure that during normal operation of the movement, the last-but-one turn 9 cannot come into contact either with the outer turn 7 or with the stud 6. Since the expansions (and naturally also the compressions) of the last-but-one turn 9 are not impeded at any time during normal operation of the movement, the deformations of the turns always remain concentric, thereby leading to a significant improvement in the isochronism of the balance and hairspring assembly.

In practice, in order to retain a safety margin, the terminal portion of the outer turn 7 can be positioned far enough away from the last-but-one turn 9 so as to ensure that the latter cannot reach said terminal portion even during expansions of the hairspring going as far as amplitudes corresponding to the absolute maximum angle of rotation of the balance, i.e. the knocking angle.

Figure 8:
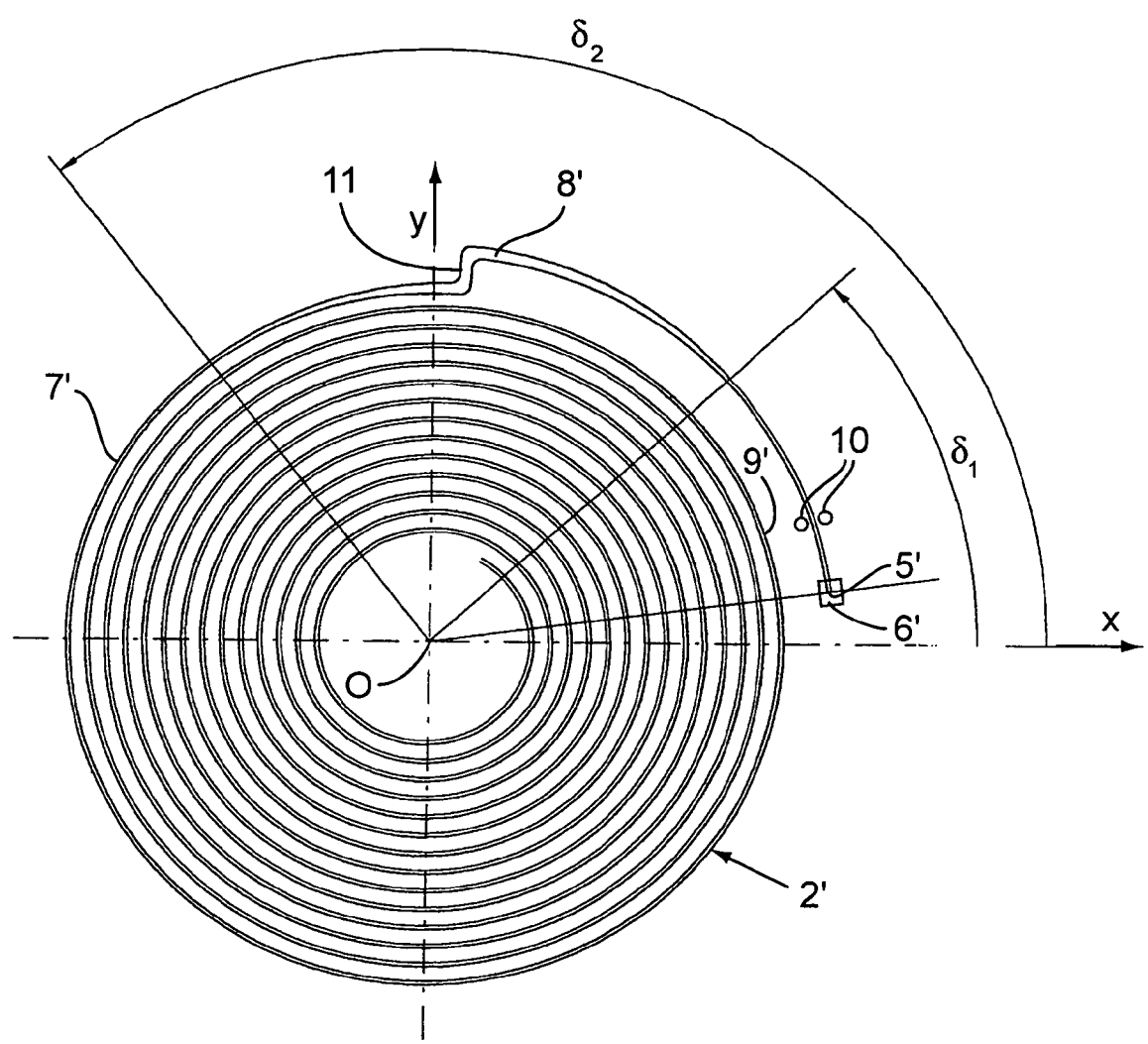
FIG. 8 is a plan view showing the hairspring of a regulating device according to a second embodiment of the invention, together with accessory elements thereof.

FIG. 8 shows a second embodiment of the invention, in which the regulating device comprises in particular a hairspring 2' having a stiffened outer turn portion 8', a stud 6' for fastening the outer end 5' of the hairspring, and an index, of which only the pins 10 are shown, for adjusting the active length of the hairspring 2'. The stiffened outer turn portion 8' presents a double bend 11 in its central portion. This double bend 11 enables the terminal portion of the outer turn 7', from the double bend 11 to the outer end 5', firstly to be far enough away from the last-but-one turn 9' to ensure that neither this terminal portion nor its accessories such as the stud 6 and the pins 10 can impede the expansions of the last-but-one turn 9', and secondly to have a generally circularly-arcuate shape of center O that is adapted to rotation of the index. Nevertheless, in a variant, the index and its pins 10 could be omitted.

There follows a description of the method for designing the hairsprings 2 and 2'.

Firstly, an Archimedes' spiral is defined in a frame of reference (O, x, y), by the known formula:

$$r(\theta) = r_0 + p\theta$$

where $r_0$ and $p$ are predetermined constants and where $r$ and $\theta$ are polar coordinates in the frame of reference (O, x, y).

This spiral is given a strip thickness $e_0$ in the plane of the spiral and a strip height $h_0$ perpendicular to the plane of the spiral. These values $e_0$ and $h_0$ are constant over the entire length of the spiral.

The coordinates $(x_G, y_G)$ of the center of gravity G of the hairspring obtained in this way are calculated as follows:

$$x_G = \frac{1}{L}\int_0^L x\, ds$$

$$y_G = \frac{1}{L}\int_0^L y\, ds$$

where L is the length of the hairspring and ds is the incremental length along the hairspring.

Using these equations:

$$x = r\cos\theta$$

$$y = r\sin\theta, \text{ and}$$

$$ds = \sqrt{r^2(d\theta)^2 + (dr)^2} = \sqrt{r^2(d\theta)^2 + p^2(d\theta)^2}$$

the coordinates $x_G$ and $y_G$ can also be written as follows:

$$x_G = \frac{1}{L}\int_0^{2\pi N} r\cos\theta\sqrt{r^2(d\theta)^2 + p^2(d\theta)^2}$$

$$y_G = \frac{1}{L}\int_0^{2\pi N} r\sin\theta\sqrt{r^2(d\theta)^2 + p^2(d\theta)^2}$$

where N is the real number of turns of the hairspring.

The unbalance of the hairspring is then deduced as calculated at the center of gravity G:

$$\vec{b}_G = m\vec{OG}$$

where m is the total mass of the hairspring: $m = \varrho e_0 h_0 L$ where $\varrho$ is the mass density of the hairspring, and the vector $\vec{OG}$ defined by the points O and G (which are assumed to be situated in the same plane parallel to the plane of the hairspring) has as its modulus:

$$a = \sqrt{x_G^2 + y_G^2}$$

A portion of the outer turn that is to be made inactive will then be determined so that the unbalance $\vec{b}_G$ which is responsible for the anisochronism of the balance and hairspring assembly becomes zero. This portion of the outer turn will then be reinforced so that it loses its elasticity and constitutes a "dead zone" that does not participate in the deformations of the outer turn.

Figure 9:
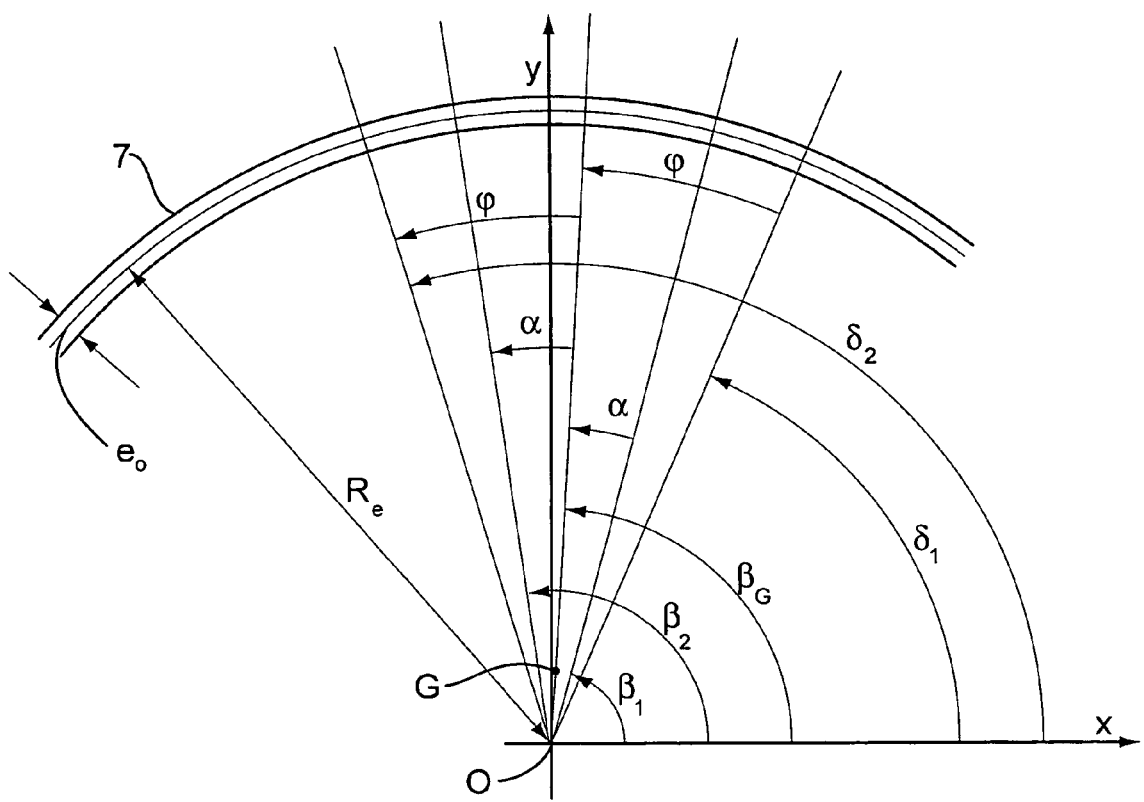
FIG. 9 is a diagrammatic plan view showing how a portion to be stiffened of the outer turn of the hairspring of the regulating device of the invention is determined.

To eliminate the unbalance $\vec{b}_G$, the portion of the turn that is to be made inactive must itself present an unbalance $\vec{b}$ equal to the unbalance $\vec{b}_G$. This turn portion is necessarily such that the point G lies between the point O and said turn portion and has an angular extent $\beta_2 - \beta_1 = 2\alpha$ (cf. FIG. 9) that is symmetrical about the axis passing through the points O and G.

By assuming that this outer turn portion is a circular arc of mean radius (half-thickness radius) $R_e$, of center O, and of mass $\Delta m$, the modulus of its unbalance $\vec{b}$ is equal to $R_e \Delta m$, where:

$$\Delta m = \varrho e_0 h_0 \Delta L \text{ with } \Delta L = R_e(\beta_2 - \beta_1) = 2R_e\alpha$$

which gives:

$$R_e \Delta m = ma = \varrho e_0 h_0 L a$$

i.e.:

$$2R_e^2 \alpha = La$$

whence:

$$\alpha = \frac{La}{2R_e^2}$$

and:

$$\beta_1 = \beta_G - \alpha$$

$$\beta_2 = \beta_G + \alpha$$

where $\beta_G$ is the angular position of the point G:

$$\beta_G = \text{Arctan}(y_G/x_G).$$

Figure 10:
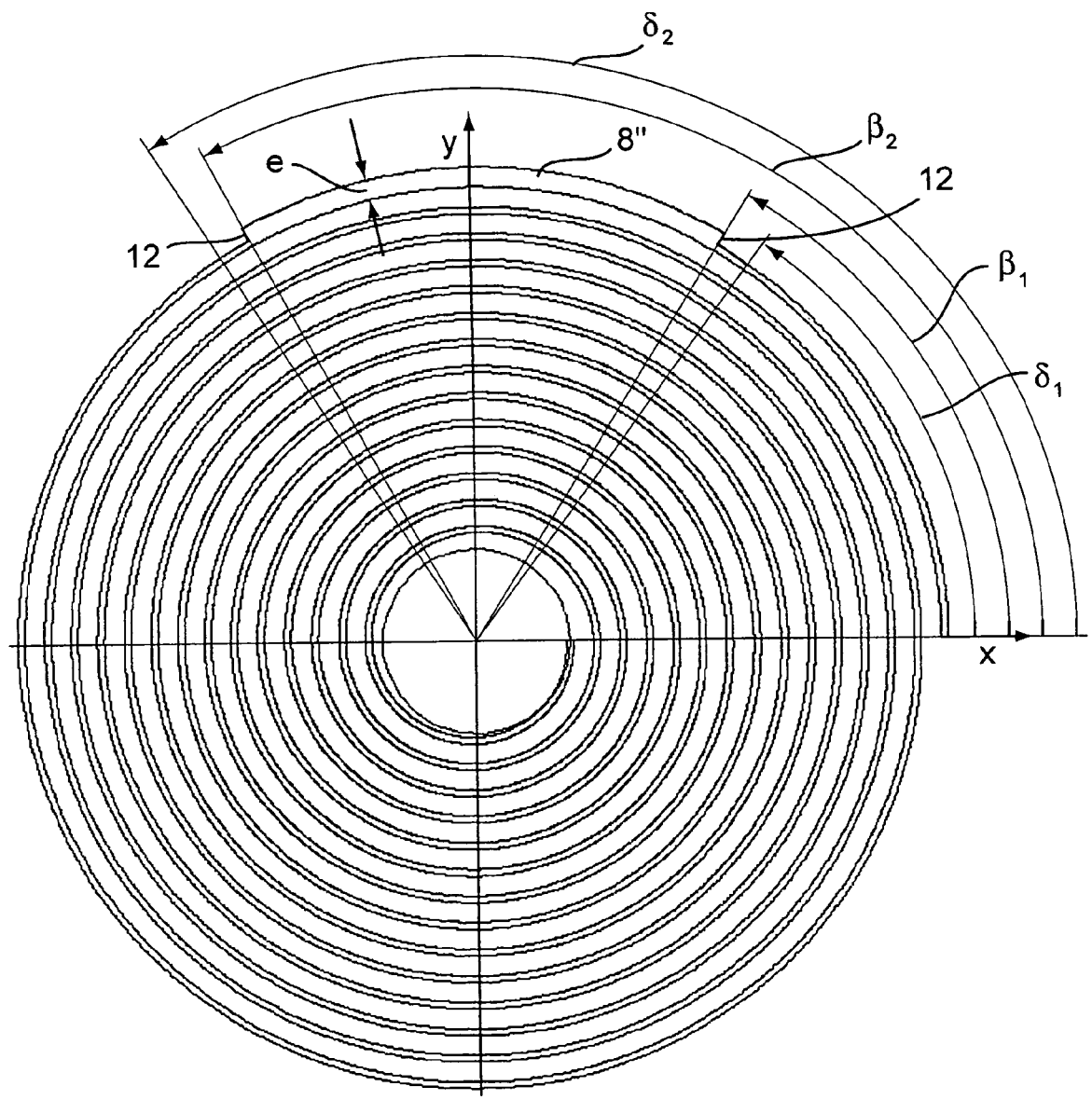
FIGS. 10 to 12 are plan views showing variants of an intermediate hairspring shape obtained during a method of designing the regulating device of the invention.

The section of the outer turn portion delimited by the angles $\beta_1$ and $\beta_2$ is then reinforced by giving this outer turn portion a thickness e in the plane of the hairspring that is greater than the thickness $e_0$, e.g. that is equal to three times the thickness $e_0$. FIG. 10 shows the hairspring as obtained in this way with its stiffened portion being identified by reference 8".

Preferably, in order to avoid or at least reduce any risk of the hairspring breaking during fabrication or while in operation at the radially extending straight ends 12 of the stiffened portion 8", the shape of the stiffened portion 8" is corrected so as to soften the transition between the latter and the remainder of the strip. This correction of the shape of the stiffened portion 8" is typically performed as follows:

Initially, a function $f=e(\theta)$ is selected that is representative of the thickness in the plane of the hairspring of the corrected stiffened portion as a function of polar angle $\theta$. This function f is convex and continuous, and presents a minimum equal to the thickness $e_0$ at each of the two ends of the stiffened portion.

Thereafter, the angular extent $\delta_2-\delta_1$ of the corrected stiffened portion is calculated. This angular extent $\delta_2-\delta_1$ includes the angular extent $\beta_2-\beta_1$ of the stiffened portion 8" shown in FIG. 10; in other words $\delta_1<\beta_1$ and $\delta_2>\beta_2$ (cf. FIGS. 9 and 10).

In order to determine the angles $\delta_1$ and $\delta_2$, it is assumed that the corrected stiffened portion is to deform in the same manner as the turn portion defined by said angles $\delta_1$ and $\delta_2$ in the hairspring of FIG. 10. Assuming that the stiffness of the stiffened portion 8" is infinite, which is the ideal theoretical value, the deformation of the turn portion of the hairspring of FIG. 10 between the angles $\delta_1$ and $\delta_2$ is equal to the sum of the respective deformations of the turn portions between the angles $\delta_1$ and $\beta_1$ and between the angles $\beta_2$ and $\delta_2$. The component along the axis (O, x) of this deformation can thus be written as follows:

$$D_x^{e_0} = \frac{12M}{h_0 e_0^3}\left[\int_{\delta_1}^{\beta_1} yds + \int_{\beta_2}^{\delta_2} yds\right]$$

where M is the moment of deformation or torque applied to the hairspring and, as mentioned above, $y=r \sin \theta$ with $r=r_0+p\theta$. As for the component of the deformation of the corrected stiffened portion along the axis (O, x), this can be written as follows:

$$D_x^f = \frac{12M}{h_0}\int_{\delta_1}^{\delta_2}\frac{yds}{f^2}$$

The components of the above-mentioned deformations along the axis (O, y) can be ignored since they are negligible and of the same order of magnitude as production errors. In order to reduce the number of variables, the angle $\delta_2-\delta_1$ is caused to be symmetrical about the axis passing through the points O and G. This makes it possible to define a single variable $\phi$ equal to $\beta_G-\delta_1$ and to $\delta_2-\beta_G$. This variable $\phi$ is calculated by equating the deformation components $D_x^{e_0}$ and $D_x^f$:

$$\frac{1}{e_0^3}\left[\int_{\beta_G-\varphi}^{\beta_1} yds + \int_{\beta_2}^{\varphi+\beta_G} yds\right] = \int_{\beta_G-\varphi}^{\varphi+\beta_G}\frac{yds}{f^3}$$

To solve the above equation, it is possible to perform an iterative calculation starting from a given value for $\phi$, that is large enough compared with the length of the stiffened portion 8", and then decreasing this value $\phi$ step by step until the two deformation components $D_x^{e_0}$ and $D_x^f$ become close enough to each other. Typically, the iteration algorithm is stopped as soon as:

$$|D_x^{e_0}-D_x^f|<\epsilon$$

where:

$$\varepsilon = \frac{10^{-5}(|D_x^{e_0}|+|D_x^f|)}{2}$$

Once the final value for $\phi$ has been determined, the stiffened portion is redrawn by giving it the variable thickness $e(\theta)=f$ between the angles $\delta_1$ and $\delta_2$.

By way of example, a function f that is particularly suitable for the variable thickness of the corrected stiffened portion is given herebelow:

$$f = e_0 + e_0\left\{1 + \cos\left[2\pi\frac{(\theta-\beta_G)}{\delta_2-\delta_1}\right]\right\}$$

Figure 11:
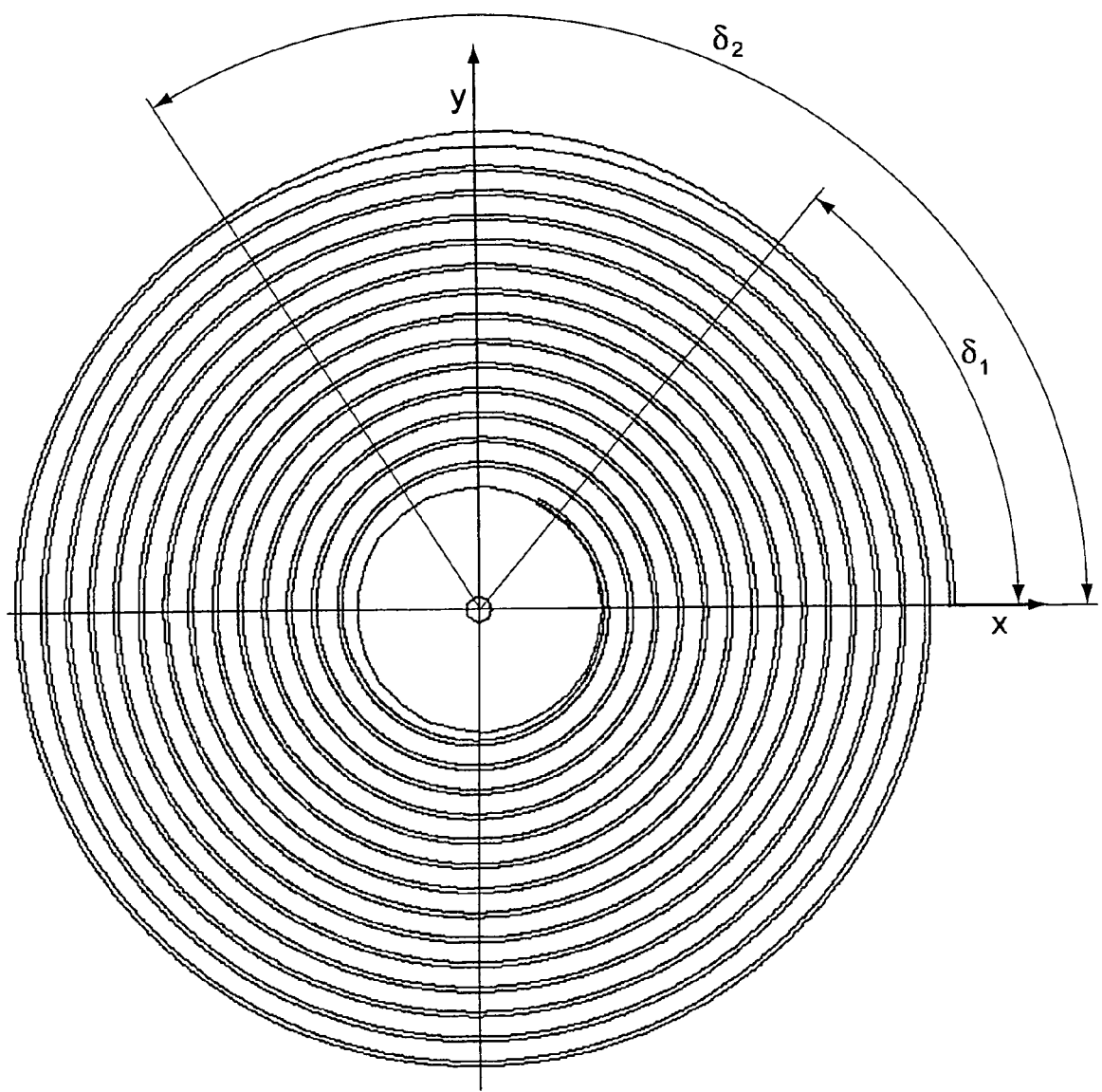

This function f presents a minimum equal to the thickness $e_0$ at both ends of the corrected stiffened portion, and a maximum equal to three times the thickness $e_0$ in the center of the corrected stiffened portion. This function f has the advantage of being convex over the entire length of the corrected stiffened portion, i.e. at all points along said length, thereby minimizing any risk of breakage. FIG. 11 shows the hairspring obtained after the step of correcting the stiffened portion with such a function.

Figure 12:
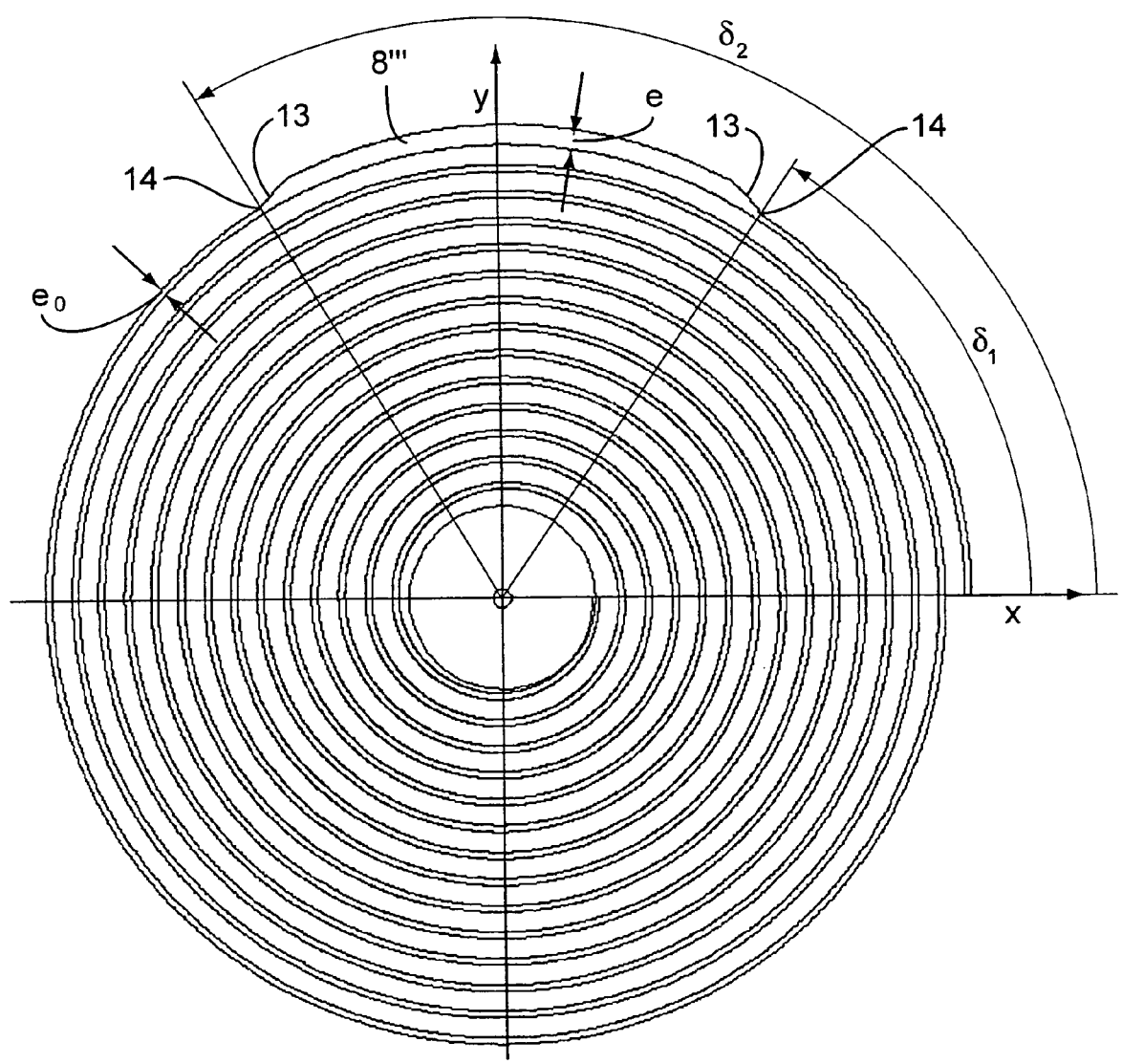

Nevertheless, the person skilled in the art will observe that other convex functions f can also be suitable. By way of example, FIG. 12 shows a hairspring obtained after the step of correcting the stiffened portion using a function f such that the thickness e of the corrected stiffened portion, identified by reference 8''', is constant over the entire length thereof with the exception of terminal portions 13 where it decreases continuously towards the ends 14 of said portion 8'''.

It should be observed that when corrected in this way by means of either one of the above-mentioned functions, the stiffened portion presents the advantage not only of reducing the risk of the hairspring breaking, but also of presenting stiffness that is greater than that of the stiffened portion 8" shown in FIG. 10 because its angular extent can be calculated on the basis of infinite stiffness for the stiffened portion 8".

Figure 13:
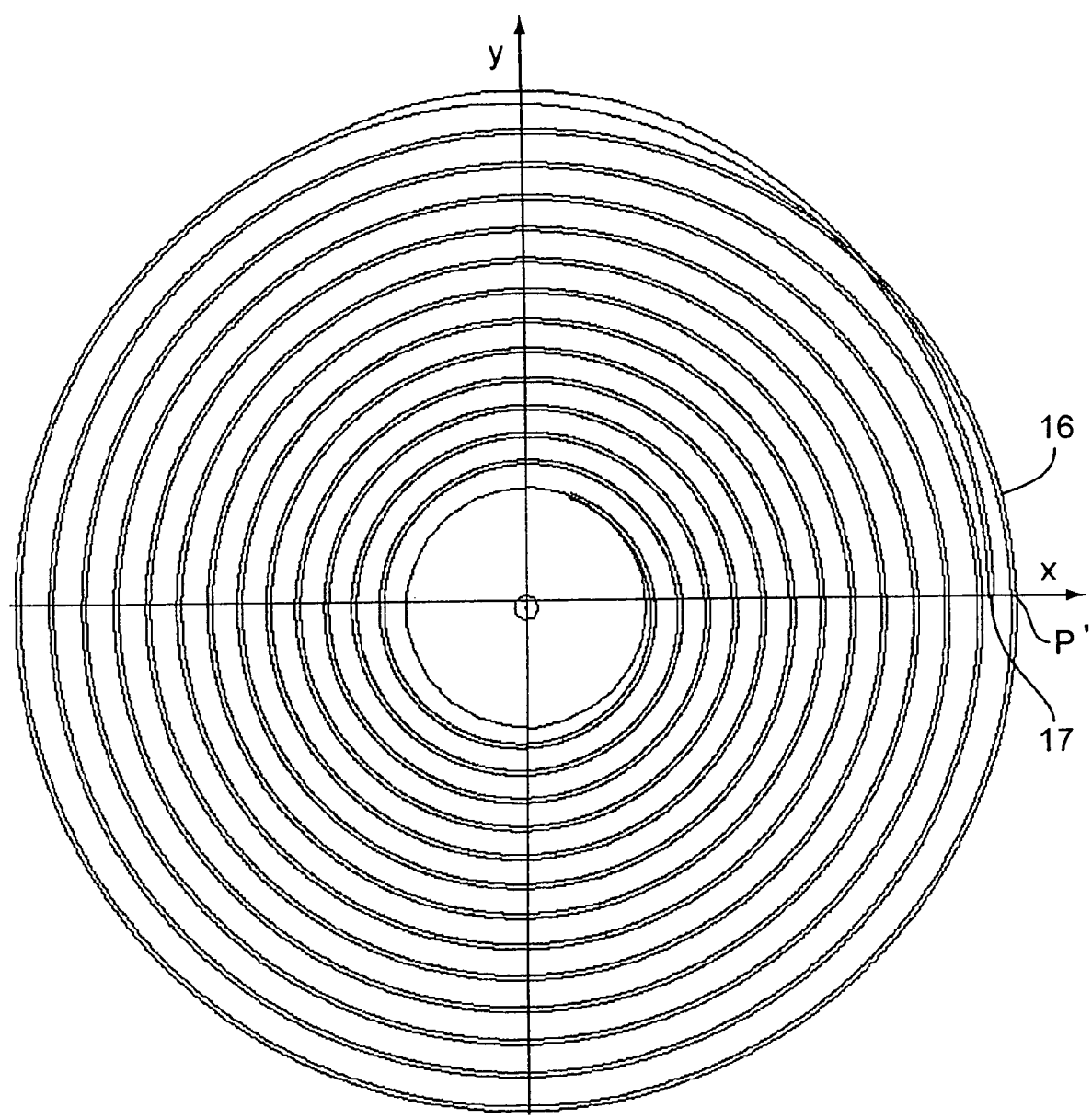
FIG. 13 is a diagrammatic plan view showing a theoretical expansion of an intermediate hairspring obtained in the design method of the invention and in which the terminal portion of the outer turn remains to be corrected.

Once the stiffened portion has been corrected, maximum expansion of the hairspring is simulated, e.g. by means of a finite element calculation, said maximum expansion corresponding to the maximum angle of rotation of the balance, and the shape of the terminal portion of the outer turn is corrected so that the terminal portion is far enough away from the last-but-one turn to ensure, as explained above, that neither the terminal portion nor its accessory elements (stud, index pins) can impede expansion of the last-but-one turn. This correction of the shape of the terminal portion is nevertheless sufficiently small to avoid significantly modifying the unbalance of the hairspring and of the stiffened portion. By way of illustration, FIG. 13 shows the theoretical expansion of a hairspring having a stiffened portion in its outer turn, but in which the terminal portion of the outer turn, whose shape has not yet been corrected, is not far enough away from the last-but-one turn. As can be seen, the last-but-one turn, identified by reference 16, extends beyond the position of the end 17 (considered as being fixed) of the outer turn, which means that in practice the last-but-one turn 16 will come into abutment against said end 17 or against the stud to which said end 17 is connected.

Figure 14:
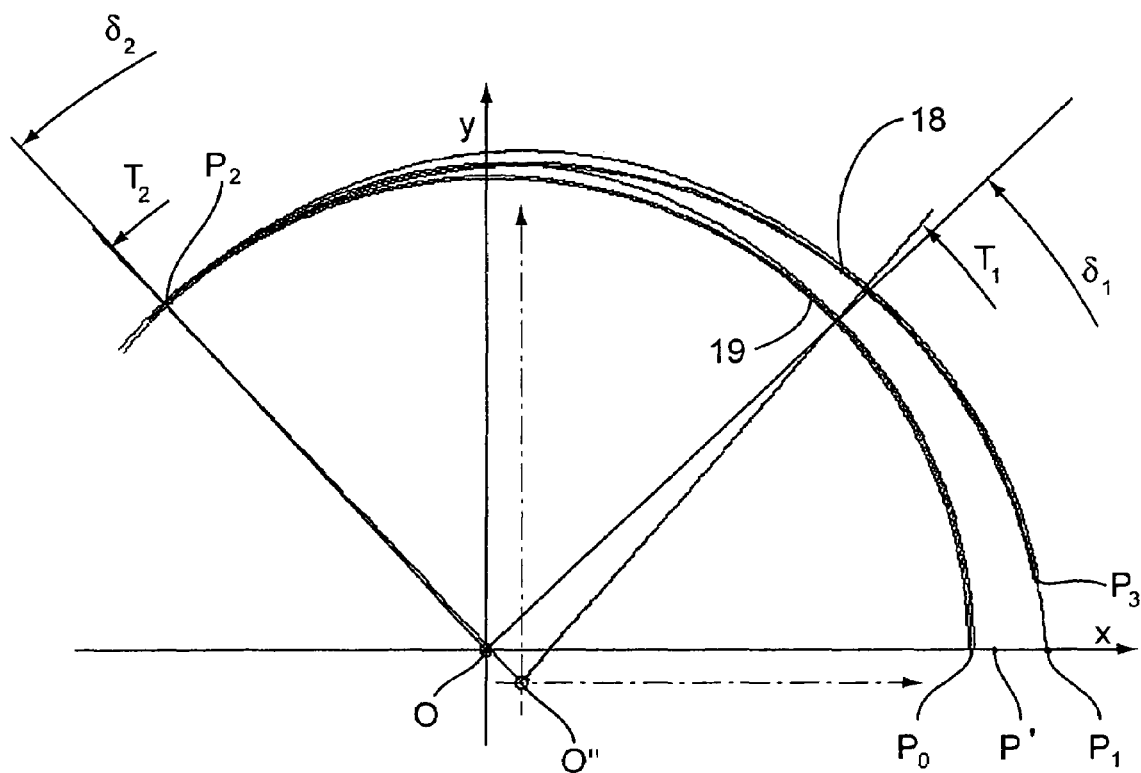
FIG. 14 is a diagrammatic plan view showing how the terminal portion of the outer turn of the hairspring shown in FIG. 13 is corrected so as to enable the last-but-one turn to remain radially free during expansions of the hairspring up to amplitudes that correspond substantially to the maximum angle of rotation of the associated balance.

To move the terminal portion of the outer turn away from the last-but-one turn, the following steps can be performed (cf. FIG. 14):

- A first point $P_1$ is defined on the radial axis passing through the outer end of the hairspring, which point is situated beyond the last-but-one turn when the hairspring is at maximum expansion, i.e. when the balance has reached its maximum angle of rotation (to do this, a theoretical configuration is assumed in which the last-but-one turn is not impeded radially and is therefore maximally expanded, as in the example of FIG. 13), and located at a distance from said last-but-one turn that is equal to about one pitch of the spiral, for example (likewise when the hairspring is at maximum expansion). In FIG. 14, the position of the outer end of the hairspring is identified by reference $P_0$ and the position of the point of intersection between the last-but-one turn and the above-mentioned radial axis when the hairspring is at maximum expansion is identified by reference P' (said position P' is also shown in FIG. 13).
- A second point $P_2$ is defined that is situated on the outer turn at the end of the stiffened portion that is farther from the outer end of the hairspring.

The first and second points $P_1$ and $P_2$ are interconnected by a circular arc 18 that is tangential to the outer turn at the second point $P_2$. The center of this circular arc 18 is identified in FIG. 14 by the reference O".

- A third point $P_3$ is defined on the circular arc 18 between the first and second points $P_1$ and $P_2$, the third point $P_3$ being such that the length of the segment of the circular arc 18 delimited by the second and third points $P_2$ and $P_3$ is equal to the length of the initial turn segment 19 delimited by the second point $P_2$ and the initial outer end $P_0$ of the hairspring.
- Two angles $T_1$ and $T_2$ are defined in a frame of reference of center O" and whose axes are parallel to the axes in the frame of reference (O, x, y). The angle $T_2$ is the angle made by the straight line segment [O", $P_2$] with the abscissa axis of the frame of reference of center O". The angle $T_1$ is such that the length of the portion of the circular arc 18 delimited by the angles $T_1$ and $T_2$ is equal to the length of the portion of the initial turn segment 19 that is delimited by the angles $\delta_1$ and $\delta_2$ in the frame of reference (O, x, y).
- The circular arc 18 between the second and third points $P_2$ and $P_3$ is given a thickness identical to that of the initial turn segment 19. This thickness therefore varies between the angles $T_1$ and $T_2$ and is constant elsewhere. The function fc=e(θ") defining said varying thickness between the angles $T_1$ and $T_2$ as a function of the polar angle θ" in the above-mentioned frame of reference of center O" is obtained by replacing the parameters $\beta_G$, $\delta_1$ and $\delta_2$ respectively by the parameters $\theta_0$", $T_1$ and $T_2$ in the function f defining the varying thickness of the portion of the initial turn segment 19 that is delimited by the angles $\delta_1$ and $\delta_2$, where $\theta_0$"=$(T_1+T_2)/2$. Thus, for example, for a function:

$$f = e_0 + e_0 \left\{ 1 + \cos\left[2\pi \frac{(\theta - \beta_G)}{\delta_2 - \delta_1}\right] \right\}$$

the function fc is given by:

$$fc = e_0 + e_0 \left\{ 1 + \cos\left[2\pi \frac{(\theta'' - \theta_0'')}{T_2 - T_1}\right] \right\}$$

The turn segment delimited by the second and third points $P_2$ and $P_3$ then constitutes the corrected terminal portion of the outer turn.

In a variant, in order to obtain the hairspring shown in FIG. 8, the following steps can be performed for moving the terminal portion of the outer turn away from the last-but-one turn:

- A point is defined on the outer turn in the stiffened portion, typically at the center thereof.
- The terminal portion of the hairspring extending from said point is offset radially outwards, by giving the inner side of said terminal portion the shape of a circular arc of center O and the outer side of said terminal portion a shape that gives said terminal portion the same thickness as that of the corresponding initial terminal portion. This thickness thus varies between said point and the angle $\delta_1$ and is constant between the angle $\delta_1$ and the outer end of the hairspring. The radial spacing between this terminal portion and the last-but-one turn is selected to be large enough to ensure that the last-but-one turn cannot reach said terminal portion even when the hairspring is at maximum expansion.
- The above-mentioned terminal portion is connected to the remainder of the stiffened portion by a straight line portion so as to form the double bend 11. This straight line portion is of sufficient thickness so as to avoid diminishing the stiffness of the stiffened portion, for example its thickness is equal to three times the thickness $e_0$ of the hairspring outside the stiffened portion.

The hairspring of the regulating device of the invention is typically made of silicon. It can be fabricated in various ways, for example using the method described in document EP 0 732 635.

The present invention is described above purely by way of example. It will be clearly apparent to the person skilled in the art that modifications can be made without going beyond the ambit of the invention. In particular, although it is preferable for the stiffened portion to be formed by increasing the thickness of the strip forming the hairspring in the plane of the hairspring, it is possible in a variant to increase the height of the strip (i.e. the thickness of the strip perpendicularly to the plane of the hairspring). Naturally, under such circumstances, the height of the strip needs to be increased by a relatively large amount in order to obtain stiffness comparable to that obtained in the case of a varying thickness in the plane of the hairspring. In another variant, both the thickness of the strip in the plane of the hairspring and the height of said strip could be varied.

The invention claimed is:

1. A plane hairspring for a regulating device of a timepiece movement and having a plurality of turns including an outer turn, the plane hairspring including along the outer turn a stiffened portion arranged to cause deformations of the turns of the hairspring to be substantially concentric when the hairspring is in operation in the timepiece movement, wherein said stiffened portion is a portion of strip of thickness in the plane of the hairspring greater than a thickness of a remainder of the strip forming the hairspring, and the extra thickness defined by the stiffened portion relative to the remainder of the strip is situated exclusively along on an outer side of the outer turn.

2. The plane hairspring according to claim 1, wherein the thickness in the plane of the hairspring of the stiffened portion varies over the entire length of the stiffened portion as a convex and continuous function and presents a minimum substantially equal to the thickness of the remainder of the strip at the two ends of the stiffened portion and a maximum that is greater than the thickness of the remainder of the strip between said two ends.

3. The plane hairspring according to claim 1, wherein the thickness in the plane of the hairspring of the stiffened portion is substantially constant over the entire length of said stiffened portion.

4. The plane hairspring according to claim 1, wherein the thickness in the plane of the hairspring of the stiffened portion is substantially constant over the entire length of said stiffened portion except in terminal portions where, respectively, the thickness decreases continuously towards the ends of said stiffened portion.

5. The plane hairspring according to claim 1, wherein the height of the hairspring is substantially constant over the entire length of said hairspring.

6. A plane hairspring for a regulating device of a timepiece movement and having a plurality of turns including an outer turn, the plane hairspring including along the outer turn a stiffened portion arranged to cause deformations of the turns of the hairspring to be substantially concentric when the hairspring is in operation in the timepiece movement, wherein said stiffened portion is a portion of strip of thickness in the plane of the hairspring greater than a thickness of a remainder of the strip forming the hairspring, and the thickness of the stiffened portion in the plane of the hairspring varies over the entire length of the stiffened portion as a convex and continuous function and presents a minimum substantially equal to the thickness of the remainder of the strip at two ends of the stiffened portion and a maximum that is greater than the thickness of the remainder of the strip between said two ends.

7. A timepiece movement including a regulating device including a balance and the plane hairspring according to claim 1.

8. The timepiece movement according to claim 7, wherein the spacing between a terminal portion of the outer turn and the last-but-one turn of the hairspring is large enough for said last-but-one turn to remain free radially during expansions of the hairspring up to amplitudes corresponding substantially to a maximum angle of rotation of the balance in said movement.

9. The timepiece movement according to claim 8, wherein the maximum angle of rotation of the balance in said movement is equal to 330°.

10. The timepiece movement according to claim 8, wherein the spacing between the terminal portion of the outer turn and the last-but-one turn of the hairspring is large enough for said last-but-one turn to remain free radially during expansions of the hairspring up to amplitudes corresponding substantially to the knocking angle of the balance in said movement.

11. A method of designing a plane hairspring for a regulating device of a timepiece movement including:
defining a plane hairspring of constant strip thickness;
calculating the unbalance of said plane hairspring;
calculating a portion of the outer turn of said plane hairspring having the same unbalance as the plane hairspring; and
stiffening said outer turn portion.

12. The method according to claim 11, wherein said stiffening step includes stiffening said outer turn portion sufficiently so that said outer turn portion substantially does not deform during operation of the hairspring.

13. The method according to claim 11, wherein said stiffening step includes increasing the thickness of said outer turn portion in the plane of the hairspring.

14. A method of designing a plane hairspring for a regulating device of a timepiece movement including:
defining a plane hairspring of constant strip section;
calculating the unbalance of said plane hairspring;
calculating a portion of the outer turn of said plane hairspring having the same unbalance as the plane hairspring; and
varying the thickness, in the plane of the hairspring, of the strip forming the hairspring between an angle $\delta_1$ and an angle $\delta_2$ such that $\delta_1 < \beta_1$ and $\delta_2 > \beta_2$, where $\beta_2 - \beta_1$ is the angular extent of said portion of the outer turn, the thickness being caused to vary in accordance with a predetermined function f presenting a minimum substantially equal to the thickness of the remainder of the strip at the angles $\delta_1$ and $\delta_2$, the function f and the angles $\delta_1$ and $\delta_2$ being selected so that the deformation of the turn portion delimited by the angles $\delta_1$ and $\delta_2$ is substantially the same as the deformation which would occur if the thickness of the strip between the angles $\delta_1$ and $\beta_1$ and between the angles $\beta_2$ and $\delta_2$ were the same as that of the remainder of the hairspring and if, between the angles $\beta_1$ and $\beta_2$, the stiffness of the outer turn were equal to a predetermined value, greater than that of the remainder of the strip.

15. The method according to claim 14, wherein said predetermined value is infinite.

16. The method according to claim 14, wherein the predetermined function f is convex and continuous.

17. A method of making a plane hairspring for a regulating device of a timepiece movement, including designing the hairspring according to the method as defined in claim 14 and then fabricating said hairspring.

18. The method according to claim 11, further including providing a spacing between a terminal portion of the outer turn and the last-but-one turn of the hairspring, said spacing being large enough for said last-but-one turn to remain free radially during expansions of the hairspring up to amplitudes corresponding substantially to the maximum angle of rotation of a balance in said movement.

19. The method according to claim 18, wherein said step of providing a spacing includes:
defining a first point on the radial axis passing through the outer end of said hairspring having said stiffened portion, the first point being situated beyond the last-but-one turn of said hairspring when said last-but-one turn is expanded by an amplitude corresponding to the maximum angle of rotation of the balance;
defining a second point on the outer turn;
interconnecting the first and second points by a circular arc that is tangential to the outer turn at the second point;
defining a third point on the circular arc between the first and second points, the third point being such that the length of the segment of the circular arc delimited by the second and third points is equal to the length of the initial turn segment delimited by the second point and the initial outer end of the hairspring; and giving a thickness in the plane of the hairspring to the circular arc between the second and third points that is identical to the thickness of the initial turn segment, the resulting turn segment between the second and third points constituting a corrected terminal portion of the outer turn.

20. The method according to claim 19, wherein the second point is situated at the end of the stiffened portion that is further from the outer end of the hairspring.

21. The method according to claim 18, wherein said step of providing a spacing includes:

defining a point on the outer turn in the stiffened portion;

offsetting the terminal portion of the hairspring extending from said point radially outwards by giving the inner side of said terminal portion a circularly-arcuate shape the center of which is the geometrical center of the hairspring and the outer side of said terminal portion a shape that gives said terminal portion a thickness in the plane of the hairspring that is identical to the thickness of the corresponding initial terminal portion of the outer turn; and connecting the terminal portion with the remainder of the stiffened portion by a connection portion that forms a double bend.

22. A method of making a plane hairspring for a regulating device of a timepiece movement, including designing the hairspring according to the method as defined in claim 11 and then fabricating said hairspring.

* * * * *